United States Patent [19]

Birkhauser, III

[11] Patent Number: 4,681,520

[45] Date of Patent: Jul. 21, 1987

[54] WINDSHIELD REPAIR ASSEMBLY

[75] Inventor: Robert R. Birkhauser, III, Madison, Wis.

[73] Assignee: Auto Glass Specialists, Inc., Madison, Wis.

[21] Appl. No.: 880,060

[22] Filed: Jun. 30, 1986

Related U.S. Application Data

[63] Continuation-in-part of Ser. No. 569,753, Jan. 10, 1984, Pat. No. 4,597,727, which is a continuation-in-part of Ser. No. 470,440, Feb. 28, 1983, abandoned.

[51] Int. Cl.$^4$ .............................................. B29C 31/04
[52] U.S. Cl. .................................... 425/12; 156/94; 264/36; 425/13; 425/189; 427/140
[58] Field of Search .................................... 425/11–13, 425/171, 173, 90, 96, 174, 185, 188, 189; 264/22, 36, 102; 156/94, 379, 382; 427/140; 417/63, 236, 440

[56] References Cited

U.S. PATENT DOCUMENTS

| | | | |
|---|---|---|---|
| 1,073,263 | 9/1913 | Martin | 425/11 |
| 1,781,200 | 11/1930 | Spiros | 156/379 |
| 1,963,576 | 6/1934 | Boerlage | 417/236 |
| 3,413,391 | 11/1968 | Carroll et al. | 264/102 |
| 3,562,366 | 2/1971 | Sohl | 264/23 |
| 3,765,975 | 10/1973 | Hollingsworth | 156/94 |
| 3,841,932 | 10/1974 | Forler et al. | 156/94 |
| 3,988,400 | 10/1976 | Luhman, III | 264/36 |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,132,516 | 1/1979 | Story | 425/13 |
| 4,165,397 | 8/1979 | Ogden et al. | 427/140 |
| 4,200,478 | 4/1980 | Jacino et al. | 264/36 X |
| 4,249,869 | 2/1981 | Petersen | 425/13 |
| 4,280,861 | 7/1981 | Schwartz | 425/13 |
| 4,385,015 | 5/1983 | Klettke | 264/36 |
| 4,385,879 | 5/1983 | Wilkinson | 425/12 |
| 4,419,305 | 12/1983 | Matles | 264/36 |

Primary Examiner—Richard L. Chiesa
Attorney, Agent, or Firm—Isaksen, Lathrop, Esch, Hart & Clark

[57] ABSTRACT

A repair assembly for the in-place repairing of windshields and the method for using such assembly, wherein a repair material injected into the windshield break area by a syringe and needle is forced into the windshield break through the repair assembly secured and sealed to the windshield by first applying stepped increments of measured vacuum levels and visually monitoring the windshield break area, and second applying positive pressure to the windshield break. An ultraviolet light source completes the repair by expediting hardening of the repair material within the windshield break to prevent refraction of light at the windshield break.

11 Claims, 7 Drawing Figures

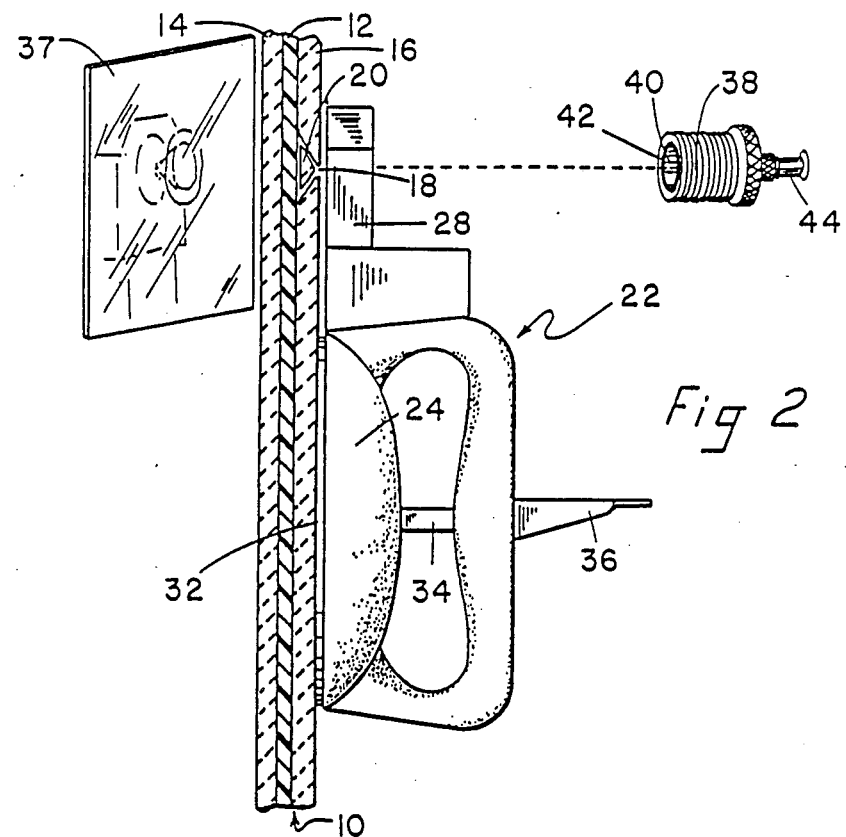
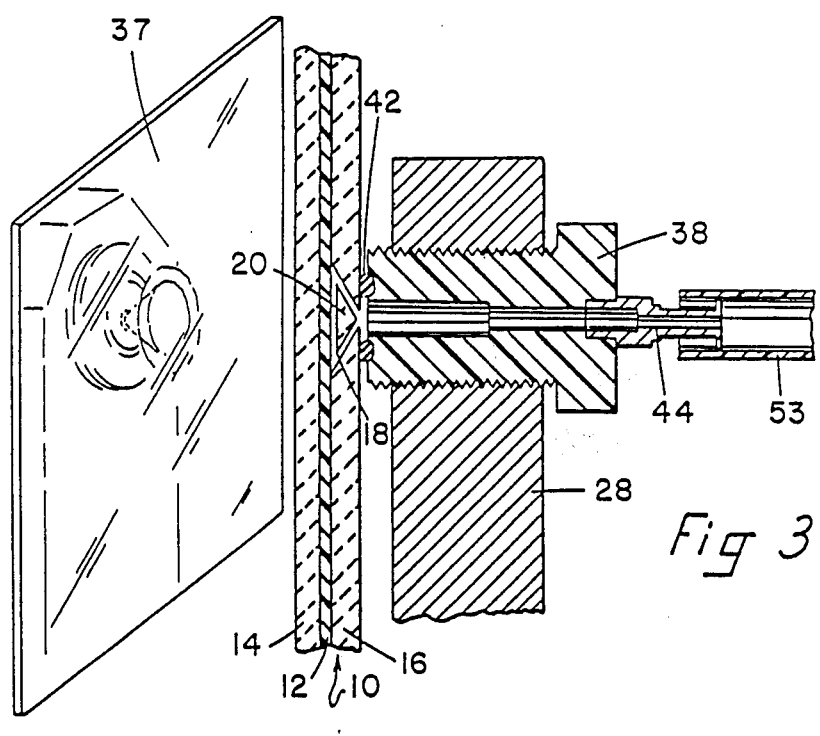

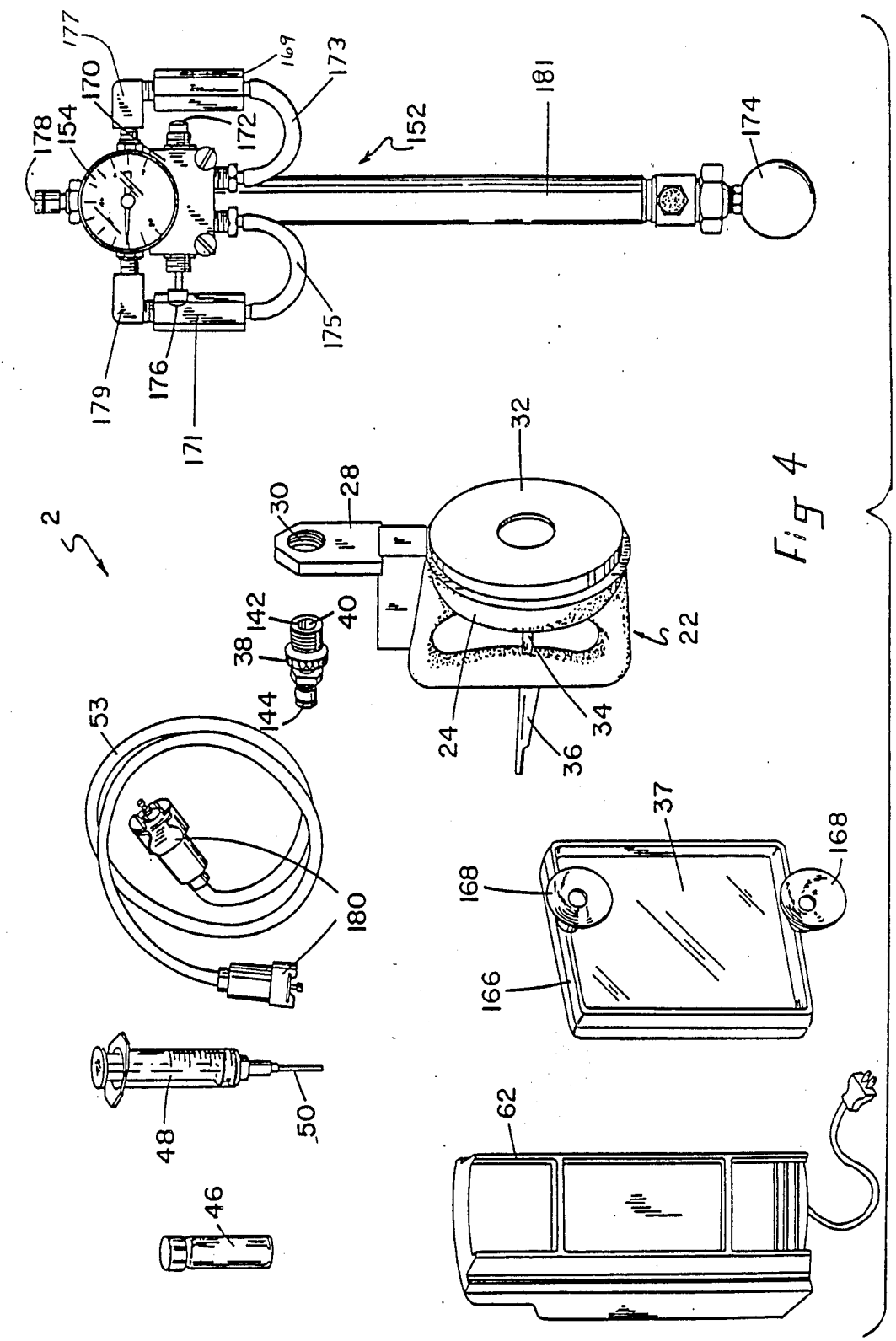

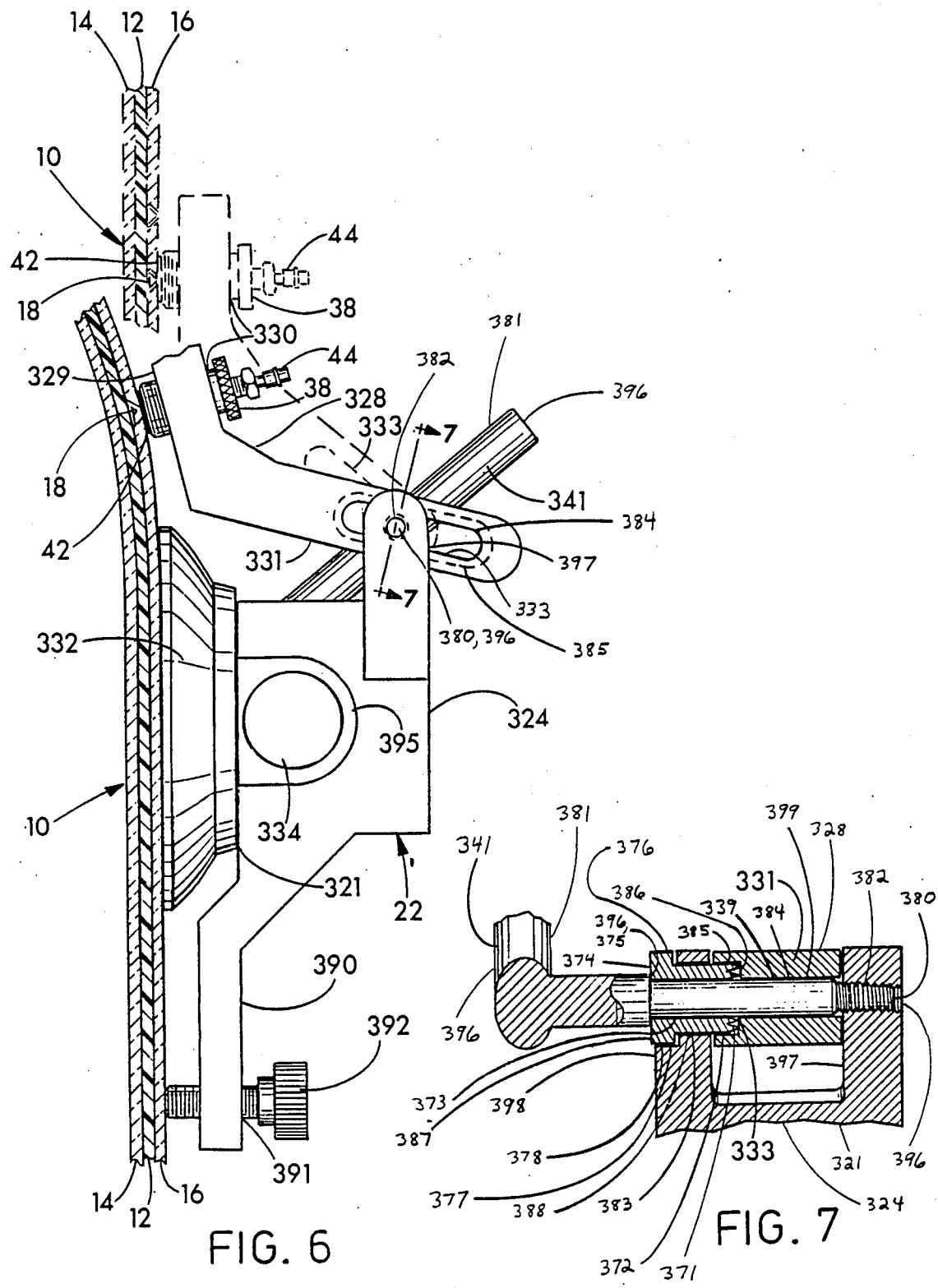

WINDSHIELD REPAIR ASSEMBLY

This application is a continuation-in-part of application Ser. No. 569,753, filed Jan. 10, 1984, which has matured into U.S. Pat. No. 4,597,727, which in turn is a continuation-in-part of application Ser. No. 470,440, filed Feb. 28, 1983, now abandoned.

FIELD OF THE INVENTION

This invention relates to a repair assembly for the in-place repairing of automobile windshields.

DESCRIPTION OF THE PRIOR ART

In U.S. Pat. No. 3,562,366 to Sohl and U.S. Pat. No. 3,765,975 to Hollingsworth, windshield cracks were repaired by using ultrasonic vibrations or mechanical force to cause a polymer solution to fill up the windshield crack. Also described in the Hollingsworth patent is the use of alternate negative and positive pressure cycles in some situations. Another method, U.S. Pat. No. 3,993,520 to Werner, et al., expedited filling of the windshield crack by outgassing the polymer solution prior to injection then applying positive and negative pressure cycles. It has been a problem in the use of negative and positive pressure cycles to designate accurate pressure levels and times sufficient to insure complete filling of the windshield crack with polymer solution or other repair materials so as to repair the windshield and to monitor progress of the repair so as to insure exhaustion of air from the windshield break cavity, thereby allowing complete filling by the repair material

SUMMARY OF THE INVENTION

The present invention is summarized in that a kit and method for repairing windshield breaks includes positioning a repair assembly over the windshield break; securing the repair assembly on the windshield; placing a screw having a lengthwise cylindrical opening and a gasket at one end into the repair assembly over the windshield break with the gasket end located on the windshield; turning the screw down on the windshield until the gasket at the end of the screw forms a generally fluid-tight seal with the windshield; injecting a repair material into the windshield break area through the screw; creating a vacuum in the range of 10-20 inches of mercury over the windshield break for about 3-7 minutes; increasing the vacuum over the windshield break to within the range of 15-25 inches of mercury and maintaining the increased vacuum for about 3-7 minutes; further increasing the vacuum over the windshield break to within the range of 20-30 inches of mercury and maintaining the further increased vacuum for about 3-7 minutes, thereby forcing air out of the windshield break; and creating a positive pressure over the windshield break for about 3-10 minutes, thereby forcing the repair material into the windshield break.

It is an object of the present invention to provide a reusable kit and simple method for repairing windshield breaks.

It is a further object to provide a means to obtain maximum visual monitoring of the windshield repair, including formation of a generally fluid-tight seal of the apparatus on the windshield and exhaustion of air from the windshield break area.

It is a still further object of the present invention to designate accurate pressure levels and times sufficient to insure complete filling of the windshield break with a repair material.

Other objects, advantages and features of the present invention will become apparent from the following specification when taken into conjunction with the accompanying drawings

BRIEF DESCRIPTION OF THE DRAWINGS

FIG. 2 is a schematic representation of the repair assembly portion of the windshield repair kit of FIG. 1 applied to a windshield with a bulls-eye crack.

FIG. 3 is a close-up, cross-sectional view of the repair assembly applied to a windshield with a bulls-eye crack.

FIG. 4 is a plan view of an alternate embodiment of a kit for repairing windshields with a bulls-eye crack.

FIG. 6 is a schematic representation of a second alternative embodiment of a windshield repair assembly as applied to a windshield with a bulls-eye crack.

FIG. 7 is a section view taken along section line 7—7 of FIG. 6.

DESCRIPTION OF THE PREFERRED EMBODIMENTS

Figure 1:
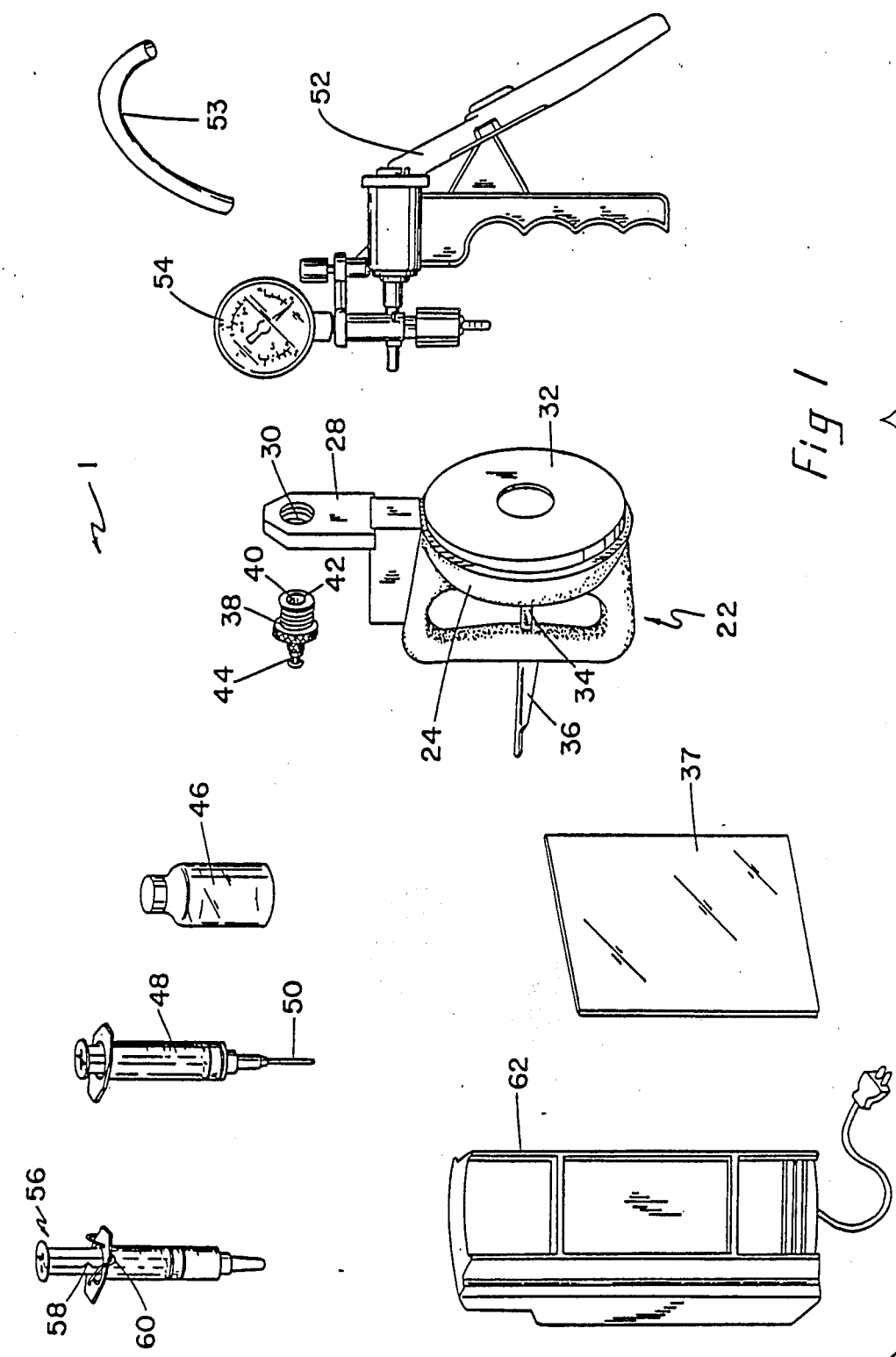
FIG. 1 is a plan view of a kit for repairing a windshield with a bulls-eye crack.

FIG. 1 illustrates the windshield repair kit 1 which is used to repair windshields according to the present method.

Referring to FIG. 2, the windshield 10 to be repaired comprises a plastic layer 12 sandwiched between an inner glass layer 14 and outer glass layer 16. As is typical of bulls-eye cracks in safety glass windshields, the outer glass layer 16 has a cone-shaped cavity 18 containing a conical glass segment 20. The area of the cavity 18 is to be filled in with a repair material which will harden so as to retain the conical glass segment 20 in place and prevent refraction of light at the cavity 18. A repair assembly 22 is shown mounted in position on the windshield 10 so as to commence repair of the windshield break indicated by the cavity 18.

The components required to repair a pockmarked windshield are supplied in the form of a kit 1, as illustrated in FIG. 1. A repair assembly 22 is shown which is comprised of a base 24 which has an opening, not shown, a neck 28 attached to the base 24 having a circular opening 30, shown in FIG. 1, a suction cup 32 attached to one side of the base 24, an arm 34 attached to the suction cup 32 and projecting perpendicular to the base 24 through the base opening and a clamp 36 attached to the arm 34 and adapted to move so as to pull the arm 34 outward. A mirror 37 is provided which is adapted to be placed against the windshield 10 on the side of the windshield opposite the repair assembly 22. Also shown is a screw 38 which is adapted to be positioned in the circular opening 30 of the repair assembly neck 28. The screw 38 has a lengthwise cylindrical opening 40 and gasket, such as an o-ring 42, attached to the end of the screw 3S opposite the head of the screw 38. A tube 44 is provided, which tube 44 is adapted to be positioned in the end of the screw cylindrical opening 40 opposite the o-ring 42.

A repair material 46 is included which is adapted to fill in the cone-shaped cavity 18 surrounding the conical glass segment 20, shown in FIG. 2. The kit includes a repair material applicator adapted to fit into the cylindrical opening 40 of the screw 38. The repair material applicator shown in FIG. 2 is a syringe 48 which is adapted to fill up with the repair material 46. Also provided is a needle 50 which is adapted to attach to the syringe 48 and to be inserted in the tube 44. Alternatively, the repair material applicator could be a disposable plastic container, with or without a premeasured amount of repair material 46, which container would have a snoutlike dispenser adapted to fit into the cylindrical opening 40 or tube 44. Any device which can deliver selected amounts of repair material 46 within the cylindrical screw 40 to the windshield break area 18 would be suitable for use as a repair material applicator.

A vacuum pump 52 is shown which is adapted to attach by means of a hose 53 to the screw 38 or, alternatively, to the tube 44. A gauge 54 measures the level of vacuum supplied by the pump. Also shown is a positive pressure applicator 56 adapted to be inserted in the screw 38 or, alternatively, in the tube 44. The positive pressure applicator 56 in one embodiment is a syringe which has a notched handle 58 which notch can be engaged by a clip 60 located on the pressure syringe. Instead of a pressure syringe an air pump (not shown) with a conventional check valve apparatus can be used as a positive pressure applicator. Alternatively, a single apparatus capable both of pulling a vacuum and applying pressure can be used in place of the vacuum pump 52 and the positive pressure applicator 56; this would be advantageous because only one attachment to the screw 38 or the tube 44 need be made.

In case a repair material is selected which must be treated with ultraviolet light before it will harden within the windshield crack, an ultraviolet light source 62 is provided which is adapted to provide ultraviolet light to the area surrounding the bulls-eye crack in the windshield once the repair material has been inserted in the bulls-eye crack.

FIG. 4 illustrates an alternative embodiment, kit 2. The parts of kit 2 which are identical with kit 1 are numbered accordingly. The parts which are different in kit 2 are numbered in a 100-series.

In kit 2 the mirror 37 is mounted on a support frame 166 which is secured on the windshield by means of a pair of suction cups 168. The screw 38 adapted to be positioned in the circular opening 30 of the repair assembly neck 28 has a quad ring 142 for a gasket, instead of the o-ring 42 shown in FIG. 1. The quad ring 142 provides a better low-pressure seal in both negative and positive pressure ranges which is important for star breaks which can be increased by excess pressure.

A tube 144 is provided which is adapted to be positioned in the end of the screw cylindrical opening 40. The tube 144 is made out of Delrin, a synthetic material which doesn't absorb moisture; a quick-connect fitting (not shown) is mounted at the end of the Delrin tube 144.

A unitary fluid pressure pump 152 is provided, which takes the place of the vacuum pump 52 and positive pressure applicator 56 illustrated in FIG. 1. The fluid pressure pump 152 has a two-way valve 170, manipulated by caps 172 and 176, which valve 170 controls whether the pump 152 draws a negative pressure or a positive pressure. Two check valves 169 and 171 are connected by means of tubing 173 to the two-way valve 170. The two check valves 169 and 171 are also connected by means of fixtures 177 and 179 to a piston cylinder 181 containing a piston 174, a tube 178 similar to the tube 144 is connected to valve 170. A quick-connect fitting (not shown) is mounted at the end of tube 178. A gauge 154 is mounted on the housing of tube 178 which gauge 154 measures negative pressure in inches of mercury and positive pressure in pounds per square inch.

If cap 172 of the two-way valve 170 is pulled out, the pump supplies negative pressure when the piston 174 is pulled out because air is drawn down the tube 178, through valve 170, tubing 173, and check valve 169 into fixture 177 and piston cylinder 181. If cap 176 of the two-way valve 170 is pulled out, as is the case in FIG. 4, the pump supplies positive pressure when the piston 174 is pushed in because air is forced up through piston cylinder 181, fixture 179, check valve 171, tubing 175, valve 170, and into the tube 178. Vents in valve 170, not shown, release excess air out the pressure side during the vacuum phase when the piston 174 is pushed in, and relieve the vacuum from the vacuum side during the positive pressure phase when the piston 174 is pulled out.

The hose 53 is provided with a pair of fastening clips 180, one at each end. Each clip 180 fastens onto the quick-connect fittings of tubes 144 and 178 to provide fluid-tight seals.

Figure 5:
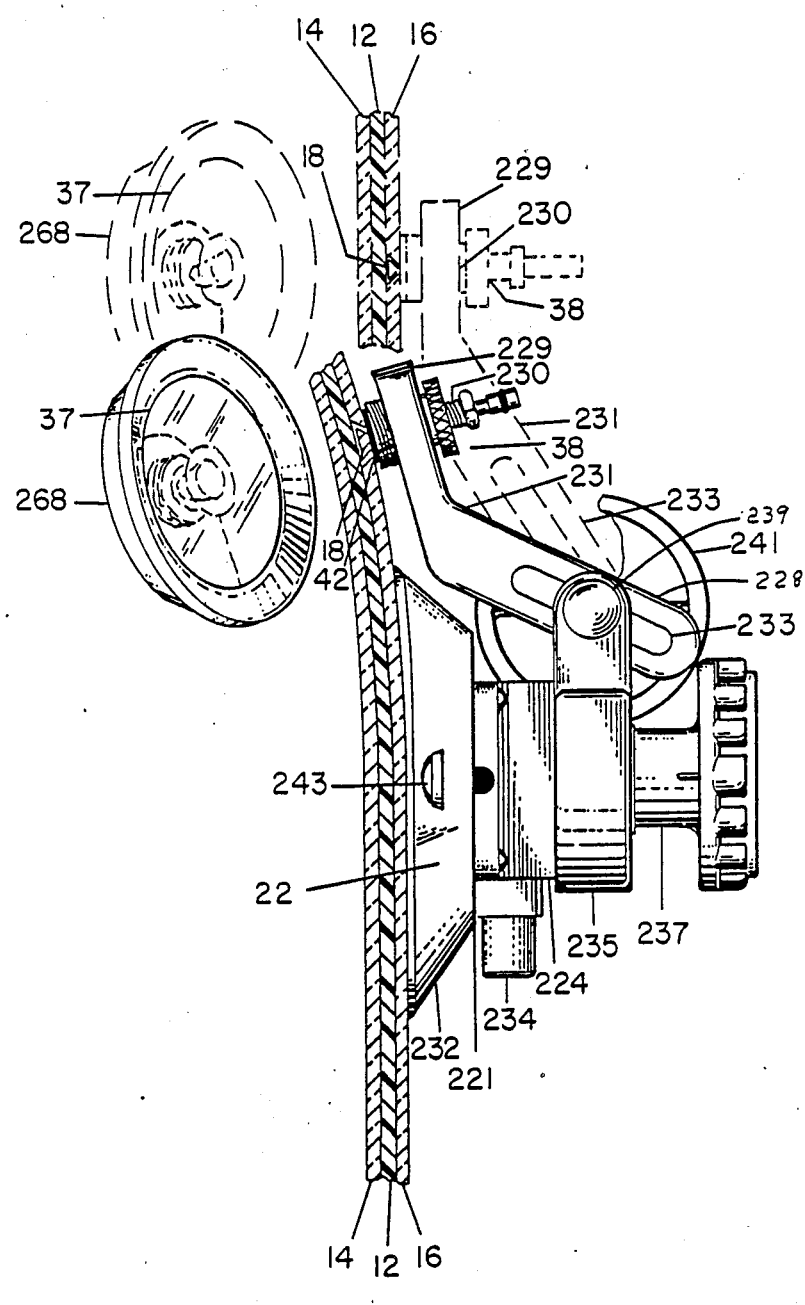
FIG. 5 is a schematic representation of a first alternative embodiment of a windshield repair assembly and a mirror as applied to a windshield with a bulls-eye crack.

FIG. 5 illustrates a first preferred embodiment of a repair assembly 22 and mirror 37 to be used in kits 1 or 2. The parts of the repair assembly 22 which are identical with the repair assembly 22 shown in FIGS. 1–4 are numbered accordingly. The parts which are different are numbered in a 200-series.

Referring to FIG. 5, the first preferred repair assembly 22 has a suction cup base 221 which can easily be purchased. The suction cup base 221 shown in FIG. 5 has a base 224 with a plurality of openings, a suction cup 232 attached to the windshield side of the base 224 which suction cup 232 has at least one handle 243 for ease in removing the repair assembly 22 from the surface of the windshield 10, and an arm 234 attached to the suction cup 232 and projecting out through a sideways opening of the base 224, which arm 234 is adapted to be movable in and out from the base 224 so as to exhaust air out from the suction cup 232, thereby forcing the edges of the suction cup 232 to adhere to the windshield 10.

The repair assembly 22 also has a neck 228 having a first section 229 with a circular opening 230 in it adapted to receive the screw 38, and also having a second section 231 formed at an angle to the first section 229 which second section 231 has a lengthwise slit 233. A first pivotal connector 235 located on top of the base 224 of the suction cup base 221 connects the suction cup base 221 to the lengthwise slit 233 of the second section 231 of the neck 228.

Associated with the first pivotal connector 235 is a first adjusting screw 237 which serves as a first adjusting means and which can be moved so as to allow the neck 228 to rotate around the suction cup base 221 by means of the first pivotal connector 235. The first adjusting screw 237 can be turned one direction in order to loosen the first pivotal connector 235 so as to allow the neck 228 to be moved into approximate position (with respect to the windshield break area 18) by rotation around the suction cup base 221, then the first adjusting screw 237 can be turned the opposite direction so as to tighten the first pivotal connector 235 so that the neck 228 will no longer be free to rotate around the suction cup base 221. Other first adjusting means such as clamps or the equivalent can be used in place of the first adjusting screw 237.

A second pivotal connector 239 extends out from the first pivotal connector 235 through the lengthwise slit 233 of the second section 231 of the neck 228. Associated with the second pivotal connector 239 is a second adjusting screw 241 which serves as a second adjusting means and which can be moved so as to allow the second pivotal connector 239 to move the length of the lengthwise slit 233, and also to allow the neck 228 to pivot around the second pivotal connector 239. The second adjusting screw 241 is analogous to the first adjusting screw 237.

The second adjusting screw 241 can be turned one direction in order to loosen the second pivotal connector 239 to move the length of the lengthwise slit 233, or to allow the neck 228 to pivot around the second pivotal connector 239 thereby moving the screw 38, located in the cylindrical opening 230 of the neck 228, directly into position over the windshield break area 18; then the second adjusting screw 241 can be turned the opposite direction so as to tighten the second pivotal connector 239 so that the second pivotal connector 239 will no longer be free to move the length of the lengthwise slit 233, and the neck 228 will no longer be able to pivot around the second pivotal connector 239; the screw 38 will thus remain securely in position over the windshield break area 18. As with the first adjusting means, other second adjusting means such as clamps or the equivalent can be used in place of the second adjusting screw 241.

The adjustments afforded by the second pivotal connector 239 are illustrated in FIG. 5 by comparing the bold-line view to the phantom view. In both views the suction cup base 221 has been placed on a relatively flat portion of windshield. In the bold-line view, the windshield break area 18 is in a curved section of the windshield 10 rather than in a flat section of the windshield 10 coplanar with the suction cup base 221. Therefore, the neck 228 has been positioned by means of the second pivotal connector 239 so that the screw 38 can be located perpendicular to the windshield break area 18, even though the plane of the suction cup base 221 is not perpendicular to the windshield break area 18. In the phantom view, the suction cup base 221 is in the same position; however, the windshield break area 18 is farther from the suction cup base 221 and in a flat section of the windshield coplanar with the suction cup base 221. Therefore, the second pivotal connector 239 has been moved with the second adjusting screw 241 so that in comparison to the bold-line view, the second pivotal connector 239 is close to the end of the lengthwise slit and the neck 228 has been pivoted around the second pivotal connector 239, in an upward direction from that shown in the bold-line view.

As shown in FIG. 5, the mirror 37 is mounted inside a suction cup 268 which suction cup 268 is adapted to adhere to the windshield upon the application of hand pressure.

FIGS. 6 and 7 illustrates a second preferred embodiment of a repair assembly 22 to be used in kits 1 or 2. The parts of the repair assembly 22 in FIG. 6 which are identical with the repair assembly 22 shown in FIGS. 1–4 are numbered accordingly and those parts which differ are numbered in a 300-series.

Referring to FIGS. 6 and 7, the second preferred repair assembly 22 is similar to the first preferred repair assembly in that it includes a suction cup base 321 with a base 324 having a plurality of openings and a suction cup 332 attached to the windshield side of the base 324, a neck 328 which has a first section 329 with a circular opening 330 to receive a screw 38 and a second section 331 formed at an angle to the first section 329, the second section 331 having a lengthwise slit 333. The repair assembly also includes the screw 38 which is inserted into the circular opening 330. However, the suction cup base 321 of the second preferred embodiment further includes a leg 390 which extends out in a sideward direction opposite the neck 328 and has a small opening 391 therein to receive a lifting screw 392, and the repair assembly 22 further includes the lifting screw 392 inserted into the small opening 391. The second preferred repair assembly 22 also has a vacuum pump 395 attached to the suction cup 332 which projects out through a sideways opening of the base 324. The vacuum pump 395 has an arm 334 adapted to be moved in and out from the base 324 to exhaust air out from the suction cup 332 so that the edges of the suction cup 332 adhere to the windshield 10. The second preferred repair assembly 22 has no parts analogous to the first pivotal connection 235 or to the first adjusting screw 237 in the first preferred repair assembly 22. The second preferred repair assembly 22 does have a pivotal connecting means 339 for pivotally connecting the neck 328 to the suction cup base 321 through the lengthwise slit 333 in the second section 331 of the neck 328. This pivotal connecting means 339 is analogous to the second pivotal connector 239 in the first preferred repair assembly 22. An adjusting and locking means 396 for adjusting and locking the position of the neck 328 in relationship to the suction cup base 321 is analogous to the second adjusting screw 241. The suction cup base 321 includes a first yoke arm 397 and a second yoke arm 398 extending therefrom to hold the pivotal connecting means 339, and the adjusting and locking means 396.

In the second preferred repair assembly 22, the pivotal connecting means 339 is a shaft 399 of an adjusting screw 341, the adjusting screw 341 having in addition to the shaft 399, a threaded end 380, a handle 381 and a flange 375 adjacent the handle 381. The first yoke arm 397 has a threaded hole 382 therethrough to receive the threaded end 380 of the adjusting screw 341, and the second yoke arm 398 has a larger hole 383 to receive the shaft 399 of the adjusting screw 341. The shaft 399 extends through the slit 333 in the neck 328 so that the neck 328 can be freely moved and pivoted to selectively position the shaft 399 within the slit 333 of the neck 32B.

The slit 333 is so defined by the neck 328 so that there is a narrow portion 384 and a broad portion 385 of the slit 333 forming a shelf 386 within the slit 333. In the second preferred repair assembly 22, the adjusting and locking means 396 includes a spacer gripper 387 having a cylindrical external portion 388 which fits through the second yoke arm 398 larger hole 383 into the broad portion 385 of the slit 333, and teeth 371 at an end 372 of the cylinderical external portion 388 which engage the shelf 386 within the slit 333. The spacer gripper 3B7 additionally has a smaller hole 373 extending axially through the spacer gripper 387 to receive the adjusting screw 341 shaft 399 in pivotal relation so that the adjusting screw 341 may be turned, and an outwardly facing end 374 opposite the end 372 with teeth 371. The adjusting and locking means 396 further includes the adjusting screw 341 handle 381, the flange 375 adjacent the handle 381, and the threaded end 380. The flange 375 abuts against the outwardly facing end 374 of the spacer gripper 387 so that turning the adjusting screw 341 in one direction moves the flange 375 against the spacer gripper 387 to engage the teeth 371 against the shelf 386 of the neck 328 and also to engage the neck 328 between the spacer gripper 387 and the first yoke arm 397 in a fixed position with relation to the suction cup base 321. Turning the adjusting screw 341 in an opposite direction disengages the teeth 371 from the shelf 386 so that the neck 328 can freely move and rotate to selectively position the adjusting screw 341 shaft 399 within the slit 333. The outwardly facing end 374 of the spacer gripper 387 includes a nut portion 376 which has four abutment surfaces 377. The suction cup base 321 has a wall 378 adjacent the second yoke arm 398. This wall 378 abuts against one of the abutment surfaces 377 on the nut portion 376 preventing the turning of the spacer gripper 387 when it is properly seated in the second yoke arm 398 larger hole 383 and the broad portion 385 of the slit 333. This provides additional assurance when the teeth 371 of the spacer gripper 387 engage the shelf 386 that the neck 328 will not pivot or move in relation to the suction cup base 321.

After the second preferred repair assembly 22 is secured on a windshield 10 and the neck 328 pivoted and moved so that the circular opening 330 directly overlies the windshield break area 18, the screw 38 should be inserted and tightened down so a seal is formed between the gasket 42 and windshield 10. The lifting screw 392 in the small opening 391 of the leg 390 can be turned to lift the leg 390 away from the windshield 10 so that the screw 38 in the circular opening 330 in the first section 329 of the neck 328 is leveragedly forced down onto the windshield 10. This downward leveraged force coupled with the downward force from tightening the screw 38 enables the gasket 42 to form a fluid-tight seal with the windshield 10.

In repairing a windshield break with kit 1 or kit 2 according to the present invention, the repair assembly 22 is first positioned on the windshield 10 so that the circular opening 30 of the neck 28 is directly over the windshield break cavity 18 as shown in FIG. 2. The repair assembly 22 is then secured on the windshield 10 by pushing the clamp 36 down parallel to the windshield 10, thereby outwardly pulling the arm 34 connected to the suction cup 32 through the base opening which causes the edges of the suction cup 32 to be forced down and adhere to the windshield 10. The mirror 37 is then placed against the windshield 10 on the side of the windshield opposite the repair assembly 22 so as to reflect the windshield break area and insure the repair assembly 22 is level on the windshield surface and to monitor further stages of the windshield repair. The mirror 37 can be secured on the windshield 10 by means of tape or by using the support frame 166 with the suction cups 168, illustrated in FIG. 4.

Next the screw 38 is placed in the circular opening 30 of the neck 28 so that the o-ring 42 or quad ring 142 is directly over the windshield break area. The screw 38 is then turned to push the gasket, o-ring 42 or quad ring 142 down on the windshield to form a generally fluid-tight seal, which can be determined by looking at the reflection of the gasket, o-ring 42 or quad ring 142 in the mirror 37. The screw 38 may also have a tube 44 or tube 144 inserted in the screw cylindrical opening 40, as shown in FIG. 2.

When the first alternative repair assembly 22 illustrated in FIG. 5 is used, the repair assembly 22 is placed on the windshield 10 in a location near the break area 10. The arm 234 is pushed until the air is exhausted from the suction cup 232 and the suction cup 232 adheres to the windshield.

The first adjusting screw 237 is moved so that the neck 228 is rotated around the suction cup base 221 into approximate position with respect to the break area 18. Next the second adjusting screw 241 is moved so as to exactly line up the circular opening 230 in the neck 228 over the break area 18. The screw 38 is then placed in the circular opening 230 and then turned until the gasket forms a tight seal on the windshield.

The second alternative repair assembly 22 illustrated in FIGS. 6 and 7 is used in quite similar fashion as the first alternative repair assembly 22 in FIG. 5, except that the second alternative repair assembly is placed near the windshield break 18 so that the neck 328 is already in approximate position with respect to the break area 18, and the vacuum pump 395 arm 334 instead is used to exhaust air from the suction cup 332. The adjusting screw 341 is then loosened and the neck 328 moved and pivoted so that the circular opening 330 is exactly lined up over the windshield break 18. The screw 38 is then inserted in the circular opening 330 and tightened onto the windshield 10. Additionally, with the second alternative repair assembly 22, it may be necessary to turn the lifting screw 392 in the leg 390 to leveragedly exert pressure on the gasket 42 in addition to that provided by turning the screw 38 in order to form a tight seal on the windshield 10.

The next step is to fill the repair material applicator, such as the syringe 48, with the repair material 46 and the needle 50 is attached to the syringe 48. The needle 50 is inserted into the screw cylindrical opening 40 or, alternatively, into the tube 44 or tube 144, if such a tube has been inserted in the screw cylindrical opening 40, and the syringe plunger is depressed so as to transmit the repair material 46 through the needle 50 to the surface of the windshield break area. In place of the syringe 46 and needle 50, a disposable plastic container having a snoutlike dispenser could be used. If the plastic container held a premeasured amount of repair material 46, the snoutlike dispenser could simply be placed into the tube 44 or tube 144, and the container could be squeezed so as to transmit repair material 46 to the surface of the windshield break area.

After injection of the repair material 46, the syringe 48 and needle 50 are removed from the repair assembly 22. The next step is to attach in a generally fluid-tight relation a vacuum pump 52 to the screw 38 or, alternatively, to the tube 44 by a hose 53 or other suitable connecting means; using equipment similar to that shown in FIG. 4 for kit 2, a fluid-pressure pump 152 would be attached to the screw 38 or the tube 144 by a hose 53 with fastening clips 180. The vacuum pump 52 or the fluid-pressure pump 152 is then operated so as to create a vacuum in the range of 10–20 inches of mercury over the windshield break area enclosed by the o-ring 42 or quad ring 142, as measured by the gauge 56 attached to the vacuum pump 52 or the gauge 156 attached to the fluid-pressure pump 152, for about 3–7 minutes or until air bubbles cease appearing in the mirror's reflection of the crack area, signifying initial exhaustion of air from the crack. Next the vacuum is increased to within the range of 15–25 inches of mercury by means of the vacuum pump 52 and maintained for about 3–7 minutes or until air bubbles cease appearing in the mirror's reflection of the crack area, signifying secondary exhaustion of air from the crack. In the final vacuum stage necessary to force air out of the windshield break cavity 18, the vacuum is further increased to within the range of 20-30 inches of mercury and maintained for about 3-7 minutes, or until air bubbles cease appearing in the mirror's reflection of the crack area, signifying final exhaustion of air from the crack, after which time the vacuum pump 52 is disengaged from the repair assembly 22. If a fluid-pressure pump is used, the pump 152 remains attached to the repair assembly Alternatively, a vacuum in the range of 20-30 inches of mercury could be created over the windshield break area and maintained until air bubbles cease appearing in the mirrored reflection of the windshield break area, signifying the end of air exhaustion from the windshield crack.

The next step is to create a positive pressure over the windshield break area so as to drive the repair material 46 into the cavity 18. To this end, the positive pressure applicators whether in the form of a pressure syringe 56, air pump, or fluid-pressure pump 152, is engaged in a generally fluid-tight relation in the screw cylindrical opening 40 or, alternatively, in the tube 44 or tube 144. If the positive pressure applicator is a pressure syringe, the pressure syringe plunger is then depressed to a level at which the notched handle 58 engages the notch in the clip 60. If the positive pressure applicator is an air pump or a fluid-pressure pump, pressure is applied to the desired level. In most cases, the desired level will be within the range of 40-50 pounds per square inch, easily measured on a gauge 154 of a fluid-pressure pump 152. In any case, the pressure is maintained for about 3-10 minutes, after which time the repair assembly is removed from the windshield by raising the clamp 36, thereby releasing the suction cup 32.

Many repair materials will harden within the windshield break without further processing. Some repair materials, however, especially certain polymers, must be provided with ultraviolet light to initiate a catalyzed hardening reaction. In those cases, the final repair step is to provide ultraviolet light to the windshield break area for about one minute with the ultraviolet light source 62 so as to cause the repair material 46 to harden within the windshield cavity 18.

EXAMPLE 1

According to the present invention, the repair assembly was positioned and secured on the windshield so that the circular opening of the neck was directly over the windshield break. The mirror was then placed against the windshield on the side of the windshield opposite the repair assembly and secured on the windshield with tape.

The screw, with a tube inserted in it, was then placed in the neck with the o-ring directly over the windshield break area. The screw was turned so as to drive the o-ring down on the windshield to form a generally fluid-tight seal; progress of the seal formation was monitored by watching the reflection of the screw and o-ring area in the mirror.

Next the syringe was filled with a polymeric repair material, and the needle was attached to the syringe. The needle was inserted through the tube in the screw and the syringe handle was depressed so as to transfer polymer from the syringe to the windshield break area.

The syringe and needle were then removed from the tube. A hose was positioned with one end attached to the tube in a generally fluid-tight relation and the other end attached to the vacuum pump in a similar, generally airtight fashion. A vacuum of 15 inches of mercury was exerted on the windshield break area and maintained for 5 minutes. Then the vacuum was increased to 20 inches of mercury and maintained for 5 minutes. Finally, the vacuum was further increased to 25 inches of mercury and maintained for 5 minutes.

The hose and vacuum pump were then removed, and the positive pressure applicator in the form of pressure syringe was inserted into the tube in a substantially fluid-tight relation. The pressure syringe handle was depressed, thereby exerting positive pressure on the windshield break area, until the notch in the handle engaged the clip. The pressure syringe was left in that position for 5 minutes.

The polymer used as the repair material required ultraviolet light before it would harden in the windshield crack. Therefore, in the next step, the repair assembly was removed from the windshield and the ultraviolet light source was used to supply heat to the windshield break area for 1 minute.

Many repair materials are suitable for use in the present invention. Generally the repair material chosen must have a viscosity low enough to allow the repair material to flow into the windshield break cavity and must cure rapidly to substantially the refractive index of windshield glass, with or without heating. Typical repair materials which may be used are resins and polymers. Examples of polymers which may be used include polyester, epoxy and urethane. Other suitable repair materials are described in the prior art.

A series of carefully measured and maintained vacuum steps prior to applying positive pressure to the windshield break area distinguish the present invention. Also, the prior art does not disclose the use of a hand-operated, unitary fluid pressure pump to apply both negative and positive pressures to the windshield break area. In addition, the prior art does not teach the use of a mirror to monitor seal formation and to determine the end of each stage of air exhaustion from the crack, thereby insuring complete filling of the windshield crack with repair material. There is no need to outgas the repair material prior to injection in order to permit a stronger vacuum.

Finally, the kit and its contents are reusable for repairing many windshield breaks.

It is to be understood that the present invention is not limited to the particular construction and arrangement of parts disclosed and illustrated herein but embraces all such modified forms thereof which are within the scope of the following claims.

What is claimed is:

1. A repair assembly for use in repairing windshield breaks, comprising:
    (a) a suction cup base;
    (b) a neck having a first section with a circular opening, and also having a second section formed at an angle to the first section which second section has a lengthwise slit;
    (c) means for pivotally connecting the neck to the suction cup base through the lengthwise slit of the second section of the neck;
    (d) means for adjusting and locking the position of the neck in relationship to the suction cup base; and
    (e) a screw having a lengthwise cylindrical opening and adapted to be positioned in the circular opening of the first section of the neck, wherein the suction cup base may be attached to a windshield near a windshield break and the screw may be positioned over the windshield break and substantially perpendicular to the windshield by selective moving and pivoting of the neck and selective adjustment and locking of the adjusting and locking means.

2. The repair assembly specified in claim 1 wherein the suction cup base has first and second yoke arms extending therefrom to hold the pivotal connecting means, and the adjusting and locking means.

3. The repair assembly specified in claim 2 wherein the pivotal connecting means comprises a shaft of an adjusting screw which has in addition to the shaft, a threaded end, a handle, and a flange adjacent the handle, and wherein the first yoke arm has a threaded hole therethrough to receive the threaded end of the adjusting screw and the second yoke arm has a larger hole to receive the shaft of the adjusting screw, the shaft extending through the slit in the neck so that the neck may be freely moved and pivoted to selectively position the adjusting screw shaft within the slit of the neck.

4. The repair assembly specified in claim 3 wherein
 (a) the neck defines a slit having a narrow portion and a broad portion to form a shelf;
 (b) the adjusting and locking means includes a spacer gripper with
  (i) a cylindrical external portion which fits through the second yoke arm larger hole into the broad portion of the slit,
  (ii) teeth at an end of the cylindrical external portion which engage the shelf within the neck,
  (iii) a smaller hole extending axially through the spacer gripper to receive the adjusting screw shaft in pivotal relation, and
  (iv) an outwardly facing end opposite the end with teeth; and
 (c) wherein the adjusting and locking means further includes the adjusting screw handle, the flange adjacent the handle, and the threaded end, the flange abutting the outwardly facing end of the spacer gripper so that turning the adjusting screw in one direction moves the flange against the spacer gripper to engage the teeth against the shelf of the neck to hold the neck between the spacer gripper and the first yoke arm in fixed position with relation to the suction cup base, and turning the adjusting screw in an opposite direction disengages the teeth from the shelf so that the neck may freely move and rotate to selectively position the adjusting screw shaft within the slit.

5. The repair assembly specified in claim 4 wherein the outwardly facing end of the spacer gripper comprises a nut portion which has at least one abutment surface, and wherein the suction cup base has a wall adjacent the second yoke arm, the base wall abutting the abutment surface of the spacer gripper to prevent rotation of the spacer gripper when the handle and adjusting screw flange are rotated.

6. The repair assembly specified in claim 1 wherein the suction cup base comprises:
 (a) a base having a plurality of openings;
 (b) a suction cup which is attached to a bottom side of the base; and
 (c) a vacuum pump attached to the suction cup and projecting out through a sideways opening of the base, which vacuum pump has an arm adapted to be movable inwardly and outwardly from the base so as to exhaust air out from the suction cup, thereby forcing the edges of the suction cup to adhere to the windshield.

7. The repair assembly specified in claim 1 further comprising:
 (a) a gasket attached to the end of the screw next to the windshield and adapted to form a generally fluid-tight seal with the windshield when the screw is tightened down on the windshield; and
 (b) a tube adapted to be inserted in the end of the screw cylindrical opening opposite the gasket so as to guide insertion of the repair material applicator.

8. The repair assembly specified in claim 1 wherein the suction cup base includes a leg which extends sidewardly in a direction opposite the neck and the leg has a small opening to receive a lifting screw, and the repair assembly further includes a lifting screw inserted in the small opening, which lifting screw turns to lift the leg away from the windshield so that the screw in the circular opening in the first section of the neck is forced down onto the windshield break when the repair assembly is secured on a windshield.

9. A repair assembly for use in repairing windshield breaks, comprising:
 (a) a suction cup base;
 (b) a neck having a first section with a circular opening, and also having a second section formed at an angle to the first section which second section has a lengthwise slit;
 (c) a first pivotal connector which is located on top of the suction cup base and connects the suction cup base to the lengthwise slit of the second section of the neck;
 (d) a first adjusting means which can be moved so as to allow the neck to rotate around the suction cup base by means of the first pivotal connection;
 (e) a second pivotal connector which extends out from the first pivotal connector through the lengthwise slit of the second section of the neck;
 (f) a second adjusting means which can be moved so as to allow the second pivotal connector to move the length of the lengthwise slit, and also to allow the neck to pivot around the second pivotal connector; and
 (g) a screw having a lengthwise cylindrical opening and adapted to be positioned in the circular opening of the neck first section, wherein the suction cup base may be attached to a windshield near a windshield break and the screw may be positioned over the windshield break and substantially perpendicular to the windshield by selective rotation and pivoting of the neck and selective adjustment and locking of the first adjusting means and the second adjusting means.

10. The repair assembly of claim 1 wherein the suction cup base comprises:
 (a) a base having a plurality of openings;
 (b) a suction cup which is attached to the side of the base opposite the first pivotal connector, which suction cup has at least one handle for ease in removing the repair assembly from the surface of the windshield;
 (c) an arm attached to the suction cup and projecting out through a sideways opening of the base, which arm is adapted to be movable in and out from the base so as to exhaust air out from the suction cup, thereby forcing the edges of the suction cup to adhere to the windshield.

11. The repair assembly of claim 1, further comprising:
(a) a gasket attached to the end of the screw next to the windshield and adapted to form a generally fluid-tight seal with the windshield when the screw is tightened down on the windshield; and
(b) a tube adapted to be inserted in the end of the screw cylindrical opening opposite the gasket so as to guide insertion of the repair material applicator.

* * * * *

UNITED STATES PATENT AND TRADEMARK OFFICE
CERTIFICATE OF CORRECTION

PATENT NO. : 4,681,520

DATED : July 21, 1987

INVENTOR(S) : Birkhauser, III

It is certified that error appears in the above-identified patent and that said Letters Patent is hereby corrected as shown below:

```
Column 1, line 33, insert -- . -- after "material".
Column 2, line 6, insert -- . -- after "drawings".
Column 2, line 61, "3S" should be -- 38 --.
Column 6, line 49, "32B" should be -- 328 --.
Column 6, line 59, "3B7" should be -- 387 --.
Column 9, line 10, insert -- 22. -- after "assembly".
Column 12, line 55, "claim 1" should be -- claim 9 --.
Column 13, line 1, "claim 1" should be -- claim 9 --.
```

Signed and Sealed this

Twenty-eighth Day of July, 1992

Attest:

DOUGLAS B. COMER

Attesting Officer     Acting Commissioner of Patents and Trademarks